Patented Dec. 12, 1933  1,938,662

UNITED STATES PATENT OFFICE 1,938,662

COATING COMPOSITION

Walter E. Lawson, Wilmington, Del., assignor to E. I. du Pont de Nemours & Company, Wilmington, Del., a corporation of Delaware No Drawing. Application May 26, 1928, Serial No. 280,961. Renewed July 19, 1932

14 Claims. (Cl. 134—26)

This invention relates to coating compositions containing drying oils, and specifically to coating compositions containing polymerized vinyl esters and drying oils. It is known that polymers of vinyl compounds, and specifically vinyl chloride polymers, yield somewhat brittle films which darken noticeably on exposure to sunlight or ultra-violet light. Plasticisers have been incorporated with such compounds in order to give films of the desired flexibility, but the hardness of the film is thereby decreased to such an extent that the film is susceptible to "printing". Moreover, such films darken when exposed to light to approximately the same degree as films which contain no other constituent than the vinyl compound.

My invention has for an object, therefore, the production of films and coating compositions which are sufficiently hard so as to show good resistance to printing. A further object of my invention is the production of films which under similar conditions of exposure to light darken to a noticeably lesser degree than untreated vinyl polymers. A still further object of my invention is the production of coating compositions which are characterized by a remarkably short drying time.

In its broad aspects my invention consists in the addition of drying oils to vinyl compounds, and specifically to polymerized vinyl esters of which the acetone-soluble or alphapolymer of vinyl chloride is an example. I have found that the incorporation of drying oils, for example, blown China wood oil, blown linseed oil, blown perilla oil, or blown hempseed oil in amounts up to one and one-half times the vinyl polymer content, or even higher, gives films of exceptionally desirable properties. Spraying mixtures having excellent spraying characteristics which dry with sufficient rapidity so that a second coat may be sprayed within eight minutes, if desired, are exemplified in the following example:

Example I

| | Parts by weight |
|---|---|
| Polymerized vinyl chloride, acetone soluble | 70 |
| Blown China wood oil (containing 0.1% cobalt drier calc. as metal) | 30 |
| Ethyl acetate | 80 |
| Butyl acetate | 100 |
| Acetone | 80 |
| Chlorobenzene | 100 |
| Hexalin acetate | 20 |

Example II

Another spraying mixture which has excellent spraying qualities, such that second coats may be sprayed within twenty minutes and which produces films on mahogany stained and filled wood and on shellac showing no signs of cracking upon aging, appears in the following example:

| | Parts by weight |
|---|---|
| Polymerized vinyl chloride, acetone soluble | 40 |
| Blown China wood oil, (containing 0.015% cobalt drier calc. as metal) | 60 |
| Ethyl acetate | 45 |
| Acetone | 45 |
| Butyl acetate | 60 |
| Chlorobenzene | 50 |
| Hexalin acetate | 10 |

Example III

An additional example of a spraying lacquer is as follows:

| | Parts by weight |
|---|---|
| Polymerized vinyl chloride, acetone soluble | 50 |
| Blown perilla oil (containing 0.5 parts cobalt linoleate) | 50 |
| Acetone | 80 |
| Ethyl acetate | 80 |
| Butyl acetate | 100 |
| Chlorobenzene | 100 |
| Hexalin acetate | 20 |

Example IV

Pigmented coating compositions may also be formed. An example of a pigmented composition which I have found to have excellent qualities, is as follows:

| | Parts by weight |
|---|---|
| Polymerized vinyl chloride, acetone soluble | 50 |
| Blown linseed oil (containing 0.1% cobalt drier calc. as metal) | 50 |
| Acetone | 80 |
| Ethyl acetate | 80 |
| Butyl acetate | 100 |
| Chlorobenzene | 100 |
| Hexalin acetate | 40 |
| Titanox | 150 |
| Dibutyl phthalate | 10 |

The pigmenting of this composition may be carried out in any desirable manner.—I have found it convenient to grind the pigment in a pebble mill or ball mill in the composition given below:

| | Parts by weight |
|---|---|
| Polymerized vinyl chloride | 35 |
| Titanox | 150 |
| Blown linseed oil | 15 |
| Butyl acetate | 50 |
| Chlorobenzene | 50 |
| Hexalin acetate | 40 |

Upon thorough impregnation of the mill base with the pigment, the remainder of the solvents, solids and diluents necessary can be added to the strained mill base.

My invention is not limited to the addition of drying oils to compositions containing a single vinyl ester polymer. I have found that blown drying oils can be satisfactorily used with mixtures of vinyl ester polymers, such as vinyl chloride and vinyl acetate polymers. Vinyl acetate polymers by themselves are somewhat unsatisfactory for protective finishes, because of their relatively lower resistance to water and to alcohol. An addition of sufficient polymerized vinyl chloride to polymerized vinyl acetate to improve water and alcohol resistance results in a product which is somewhat sensitive to light, and the films produced therefrom darken on exposure to sunlight. The use of a vinyl chloride—vinyl acetate—drying oil mixture is, however, perfectly feasible if the drying oil content is not increased to such a high percentage as to be incompatible in the mixture. Such a mixture, therefore, embodies the light resistivity of the vinyl acetate polymer and the water and alcohol resistivity of the vinyl chloride polymer. An example of a spraying lacquer formed from mixtures of the two polymers, is as follows:

*Example 5*

| | Parts by weight |
|---|---|
| Polymerized vinyl chloride, acetone soluble | 16.5 |
| Polymerized vinyl acetate | 5.5 |
| Blown hempseed oil (containing 0.1 part cobalt linoleate) | 9.5 |
| Acetone | 20 |
| Ethyl acetate | 20 |
| Butyl acetate | 25 |
| Chlorobenzene | 25 |
| Hexalin acetate | 10 |

*Example 6*

An additional example of the feasibility of mixing different polymerized vinyl esters is as follows:

| | Parts by weight |
|---|---|
| Vinyl chloride, alpha polymer | 70 |
| Polymerized vinyl propionate | 15 |
| Blown linseed oil (containing 0.5 parts cobalt linoleate) | 15 |
| Acetone | 75 |
| Ethyl acetate | 75 |
| Butyl acetate | 90 |
| Chlorobenzene | 90 |
| Hexalin acetate | 35 |

Vinyl propionate has an excellent softening action on the vinyl chloride film. Polymerized vinyl butyrate may be substituted for the vinyl propionate in the above formula.

I do not wish to be restricted to the precise quantities and components listed in the foregoing examples, nor to the specific drying oils which I have enumerated above. Any drying oil in which the raw oil has an iodine number of 100 or above may be suitable for my purpose. I do not wish to be restricted to blown oils since both the raw and blown oils are of value, though I have found that blown oils are somewhat more desirable because of their quick drying characteristics, and that drying oils in which the raw oil has an iodine number above 140 are particularly adapted to my purposes.

As many apparently widely different embodiments of this invention may be made without departing from the spirit thereof, it is to be understood that I do not limit myself to the foregoing examples or descripions except as indicated in the following patent claims.

I claim:

1. A composition of matter containing a polymerized vinyl ester and one of a group of compounds consisting of Chinawood oil, linseed oil, perilla oil, and hempseed oil.

2. A composition of matter containing polymerized vinyl chloride, polymerized vinyl propionate, and one of a group of compounds consisting of Chinawood oil, linseed oil, perilla oil, and hempseed oil.

3. A composition of matter containing polymerized vinyl chloride, polymerized vinyl acetate and one of a group of compounds consisting of Chinawood oil, linseed oil, perilla oil, and hempseed oil.

4. A composition of matter containing polymerized vinyl chloride, polymerized vinyl butyrate and one of a group of compounds consisting of Chinawood oil, linseed oil, perilla oil, and hempseed oil.

5. A composition of matter containing polymerized vinyl chloride, and one of a group of compounds consisting of Chinawood oil, linseed oil, perilla oil, and hempseed oil.

6. A composition of matter containing polymerized vinyl chloride and blown linseed oil.

7. A composition of matter containing a polymerized vinyl ester and a blown oil from the group consisting of Chinawood oil, linseed oil, perilla oil, and hempseed oil.

8. A composition of matter containing polymerized vinyl chloride and Chinawood oil.

9. A composition of matter containing a polymerized vinyl ester and a drying oil.

10. A composition of matter containing a polymer of vinyl chloride and a drying oil.

11. A composition of matter containing a vinyl chloride polymer, a vinyl acetate polymer, and a drying oil.

12. A composition of matter containing an acetone soluble polymer of vinyl chloride and a drying oil.

13. A composition of matter containing a polymerized vinyl ester and a blown drying oil.

14. A composition of matter containing a polymerized vinyl ester and a drying oil having an iodine number in the raw state above about 140.

WALTER E. LAWSON.